United States Patent [19]

Castle et al.

[11] Patent Number: 4,743,995
[45] Date of Patent: May 10, 1988

[54] DISK FILE WITH IN-HUB MOTOR

[75] Inventors: Frank E. Castle, Winchester; Colin P. Hatchett, Southampton; Michael R. Hatchett, Chandlers Ford; John S. Heath, Winchester, all of England

[73] Assignee: International Business Machines Corporation, Armonk, N.Y.

[21] Appl. No.: 918,184

[22] Filed: Oct. 14, 1986

[30] Foreign Application Priority Data

Oct. 31, 1985 [GB] United Kingdom ............... 85307881

[51] Int. Cl.[4] ............................................. G11B 5/012
[52] U.S. Cl. ........................................ 360/98; 360/97; 360/137
[58] Field of Search ...................... 360/98, 97, 99, 137

[56] References Cited

U.S. PATENT DOCUMENTS

| | | | |
|---|---|---|---|
| 4,005,490 | 1/1977 | Duncan et al. | 360/97 |
| 4,054,931 | 10/1977 | Bolton et al. | 360/97 |
| 4,285,018 | 8/1981 | Mulvany et al. | 360/98 |
| 4,562,499 | 12/1985 | Mizoshita | 360/98 |
| 4,692,827 | 9/1987 | Biermeier et al. | 360/97 |

FOREIGN PATENT DOCUMENTS 151260 8/1985 European Pat. Off. .
2005454 4/1979 United Kingdom .

OTHER PUBLICATIONS

Mike Pearce, "Who Needs High Capacities", Computer Systems (Nov. 1983), pp. 81–84.

*Primary Examiner*—John H. Wolff
*Attorney, Agent, or Firm*—Thomas R. Berthold

[57] ABSTRACT

A disk file comprises a disk stack subassembly and a head positioning actuator each mounted on opposite sides of a central box frame. The disk stack subassembly has a non-rotating central spindle and an in-hub electric motor whose stator is mounted on the spindle. The rotor of the motor is mounted internally of a hub supported for rotation about the spindle by two bearings at opposite ends of the spindle. A stack of disks is mounted externally on the hub. The box frame is open to one side and the opposite ends of the stationary spindle are located and fixed in the frame so that the disk stack subassembly spans the open side. Because of the symmetry and rigidity of the design, susceptibility to thermal or vibration induced misregistration is reduced. Finally a cover completes the enclosure.

12 Claims, 5 Drawing Sheets

DISK FILE WITH IN-HUB MOTOR

FIELD OF THE INVENTION

The present invention relates to disk files of the kind having in-hub motors.

BACKGROUND OF THE INVENTION

Disk files for information storage generally comprise a stack of disks mounted for rotation with a rotatable hub/spindle combination. Information is written on or read from the disks by means of a number of transducer heads which are movable to different radial positions over the disk surfaces by means of an actuator on which they are mounted.

One very common form of construction is for both actuator and disk stack spindle to be mounted on a rigid base plate beneath the stack. The spindle is normally mounted for rotation in two bearings located in the base plate through which it protrudes to permit connection to an external drive motor. Such an external drive motor may be directly attached to the spindle or may be coupled by way of a belt to an external pulley attached to the spindle. Above the base plate, the spindle supports the disk stack in cantilever fashion within a sealed head/disk enclosure. A disk file typical of this type of construction is shown in U.S. Pat. No. 4,054,931.

One problem with such a construction is that bending or vibration of the base plate or the cantilevered portion of the spindle, produced by thermal gradients or vibration sources such as the actuator and drive motor, can cause severe problems of head to track misregistration or of head to head registration. Although head to track misregistration which is identical for each head can be accommodated by a relatively simple servo system, any non-identical misregistration effects can only be handled by sophisticated servo systems employing position reference information, for example in sectors, on each disk surface. In either case, excessive need for servo correction of head position degrades performance while increasing costs.

Alternative file structures have reduced these effects by increasing the rigidity and symmetry of the disk stack support structure by replacing one-sided base plates by frame or clam-shell structures in which the spindle is supported for rotation in bearings at both ends of the disk stack. Typical of these, are the files described in British Patent GB 2005454B, U.S. Pat. Nos. 4,285,018, and 4,562,499.

While undoubtedly achieving reductions in thermal and vibration induced misregistration, the fact that these files still require the spindle to protrude through that side of the support structure from which it is to be driven introduces some unbalance into the system. Protruding spindles and external drive means also create a potential source of contamination and add to the overall bulk of the file. Such disk files have also required more parts and been more difficult to assemble than the conventional base plate type of file.

The files described in these three references are all high capacity, physically large machines, usually intended to be mounted in stand-alone cabinets. When the problems of designing small files suitable for use in desk-top equipment in an office environment are considered, many of these designs, even scaled down, are found to be relatively wasteful of space.

To save space, the use of a so-called "in-hub" motor has been proposed in the art. One disk file, known as the "Maxtor XT-1000", employing such a motor is described in the journal "Computer Systems" (November 1983 pages 81-84). In this file a rotor within the hub of the rotating disk assembly surrounds a stator mounted on a central stationary spindle. Thus, the spindle drive is centrally located in otherwise wasted space. The overall volume of the file is reduced and a potential source of imbalance and contamination is avoided. However, the Maxtor file employs a traditional base plate which supports the motor, the stack of disks and also a swing-arm actuator from beneath. The construction is therefore susceptible to thermal and vibrational misregistration, particularly as the spindle is unsupported at its end remote from the base plate.

The Maxtor file is not the first instance in which an in-hub motor built around a stationary spindle has been proposed. A much earlier proposal may be found in U.S. Pat. No. 4,005,490. In this case, a file having such a motor also employs a high degree of symmetry in its construction. A rotating hub and single disk are supported for rotation by bearings at opposite ends of a stationary spindle. The spindle is supported by two bridge plates above and below the disk which are attached to a rugged cylindrical frame forming a wall around the periphery of the disk. Each bridge plate also supports a set of fixed heads as the file has no moving heads or actuators. The design has advantages of ruggedness, compactness and symmetry but is of inherently low capacity and high cost because of its single disk and very large number of heads.

Another more recent disk file employing an internal motor is described in published European patent application 0151260. This device is a multi-disk file with a swinging arm actuator both supported in one half of a monocoque (shell) die cast assembly. The other half of the shell assembly seals the head/disk assembly. The internal motor is a brushless DC motor embedded in the spindle hub. However, the spindle itself rotates and protrudes from the sealed HDA where it may be acted on by a spindle brake. The internal structure and bearing arrangement of the motor, hub and spindle is clearly not symmetrical. In particular, the stator of the motor is supported from one side only of the shell so that heat from the stator will be conducted preferentially to one side rather than the other of the structure. Thus the thermal design is highly asymmetrical.

The prior art, therefore, does not show a multi-disk moving head file with an in-hub motor having a stationary spindle as part of a frame structure so as to minimize the effects of thermal and vibration induced misregistration and which uses minimum numbers of parts and material and which is relatively easy to assemble.

SUMMARY OF THE INVENTION

According to the present invention there is provided a disk file having a disk stack subassembly comprising a non-rotating central spindle, a hub supported for rotation about said spindle by two bearings at or near the opposite ends thereof, the hub being spaced from the spindle to define a cavity, an internal electric motor within said cavity for rotating said hub, the motor having stator means mounted on the spindle and rotor means mounted within and on the hub, and a stack of disks mounted externally on the hub the file further including a rigid box frame, open to at least one side, means for locating and fixing opposite ends of the subassembly spindle to the box frame so that it spans the open side thereof whereby the disk stack subassembly is partially enclosed by the box frame, at least one actuator for positioning read/write heads radially of the disks, means for mounting the actuator on the box frame, opposite to said open side supporting the spindle, and a cover mating with the box frame on its open side so as to completely enclose the disk stack.

Compact because of the in-hub motor, such a disk file also has great rigidity because of the cage structure formed by the box frame and stationary spindle. Considerable symmetry of design about planes through and normal to the spindle axis can be achieved. This minimizes the effects of thermal or vibration induced distortions which tend to affect the structure on both sides of the spindle equally and thus cancel out or, at least, avoid bending forces on the spindle which would cause out-of-plane movement of the disks. Preferably, the box frame is substantially symmetrical about two planes passing through the center of the disk stack in directions normal to and in line with the spindle.

If two actuators are provided, the possibility of interaction between them is, preferably, reduced by arranging that they should not act in the same line but should be circumferentially disposed about the disk stack. The same design principle should also be followed if more than two actuators are employed.

In one preferred dual actuator construction, the actuators span the entire disk stack and each has a head support arm extending into each inter-disk space. The head or heads on each arm preferably serve only a single disk surface, for example, one actuator serves the under surfaces while the other serves the top surfaces of the disks. This allows the inter disk space to be considerably reduced and, thus, either more disks can be used for a given support structure or the height of the stack can be reduced to give a more rigid structure.

Alternatively, in some dual actuator applications, it may be preferable to have each actuator serve a respective upper or lower half of the disk stack, albeit at the expense of some symmetry in order that the moving parts of the head support structure should be as light and rigid as possible.

Another major advantage of the box frame file construction is its economy of parts and material, particularly if the frame is made as one casting. It is not necessary for the frame to form a complete box along its entire length, radially of the disk stack, and in the preferred form of construction, the frame comprises a box portion onkly at the periphery of the disk stack subassembly and has flanges above and below the stack for connection to the spindle ends.

The box frame construction also facilitates modular assembly of the disk stack and actuators both of which can be pre-assembled then mounted, from the sides of the frame. The entire disk/spindle assembly including bearings can be a subassembly and can thus be servo-written and tested before being mounted to the file without further assembly operations on the disk track. The spindle is preferably located by its end in a pair of open slots in the box frame or flange edges. Each end of the spindle is preferably flattened and provided with a cross bore by means of which it can be bolted to the frame edges. However, other methods of fixing such as adhesives or top bolts and clamps can be contemplated.

Similarly, the actuator or actuators which are preferably of the linear voice coil motor type can be conveniently mounted externally on the opposite side of the frame, the frame being provided with an opening through which the carriage and read/write heads of the actuator access the disk. Clearly, other ways of supporting and mounting the actuator(s) can be contemplated. For example, the box frame may be completely closed at the end opposite to the disk stack and the actuator(s) mounted internally of the box.

Although linear actuators are preferable for reasons of symmetry and because their centers of force can be arranged to lie in the central plane, normal to the spindle axis, it is also possible for one or more rotary actuators of the swinging arm type to be employed. This type of actuator is generally more compact and could be mounted similarly to a linear actuator on the opposite side of the box frame to the spindle.

The invention will now be described by way of example only with reference to preferred embodiments thereof as illustrated in the following drawings.

DETAILED DESCRIPTION OF THE INVENTION

Figure 1:
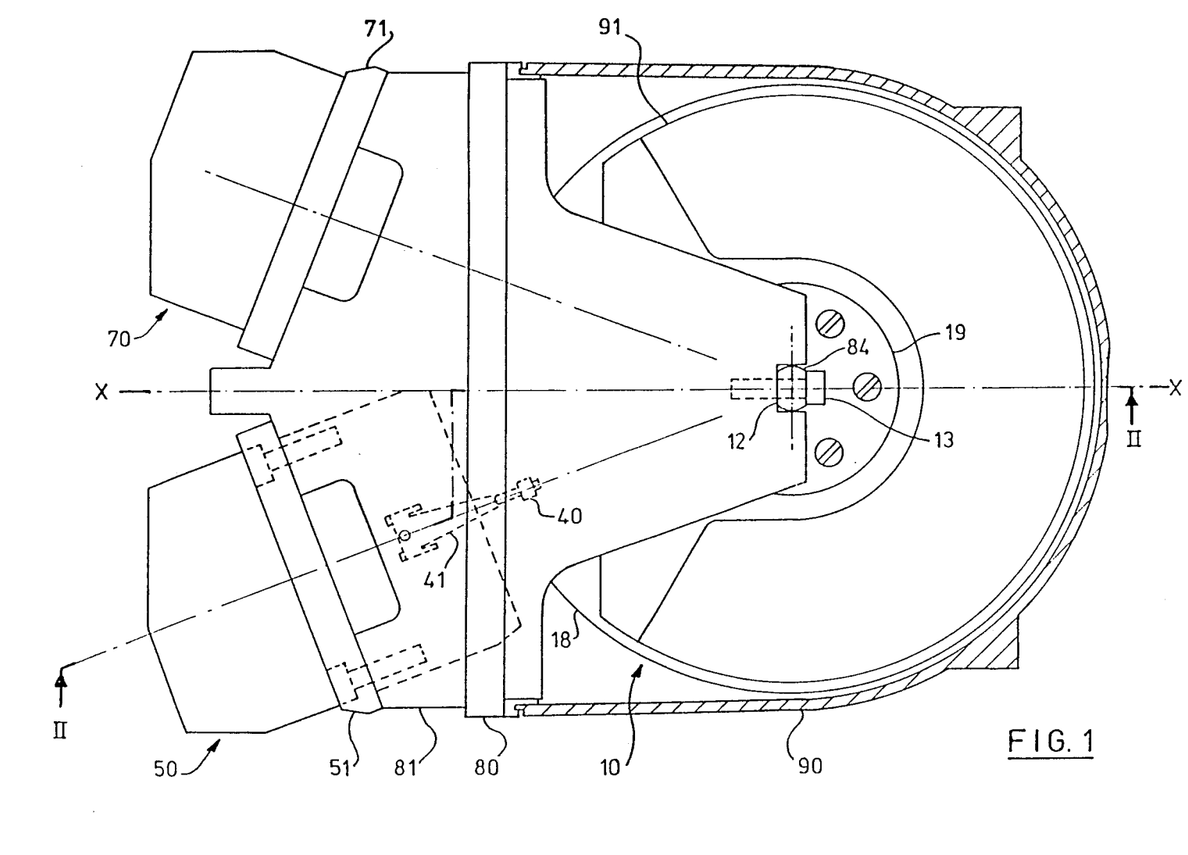
FIG. 1 is a plan view of a disk file according to the present invention with the top portion of a cover removed.
Figure 2:
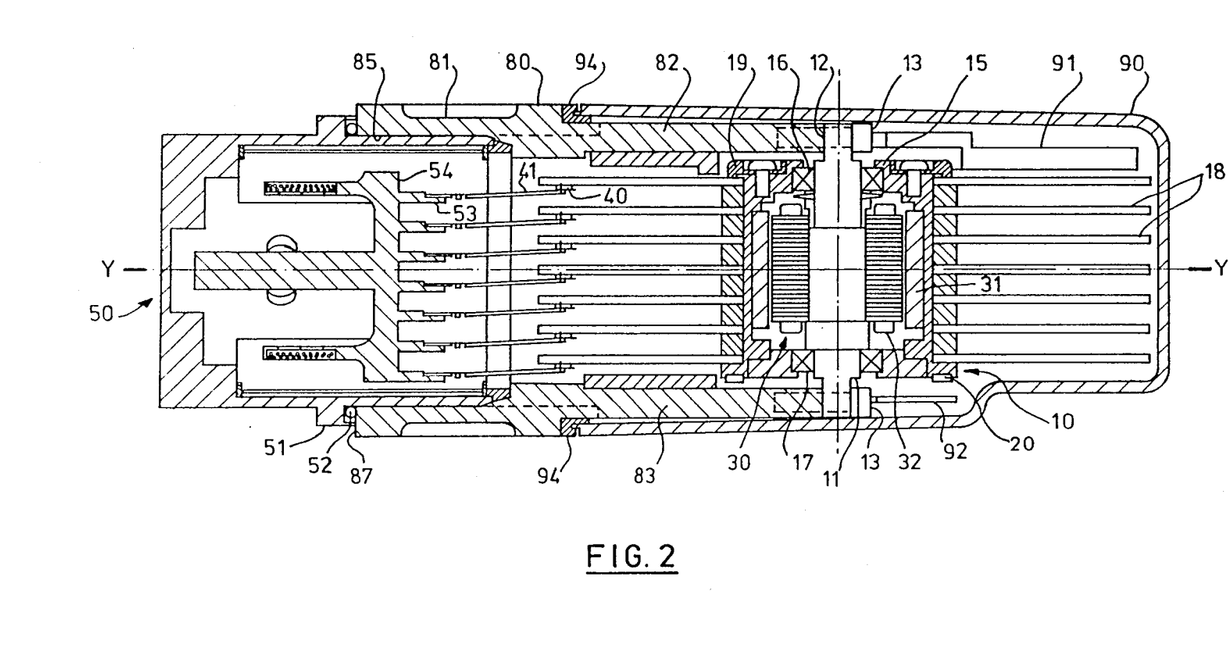
FIG. 2 is a section through the disk file of FIG. 1 taken on the line II—II.

The disk file shown in FIGS. 1 and 2 comprises three major subassemblies. These are the disk stack subassembly 10, which incorporates an in-hub motor 30, and two linear actuators 50 and 70 of the voice coil type. These subassemblies are mounted on and supported by a box frame casting 80, shown isometrically in FIG. 3, which is the major structural component of the file. The file is, thus, of essentially modular construction allowing these subassemblies to be pre-assembled and tested before the relatively straightforward operation of bolting them to the box frame. In addition to the major subassemblies mentioned, a cover 90 is also mounted on the box frame along with several minor, non-structural components.

Figure 3:
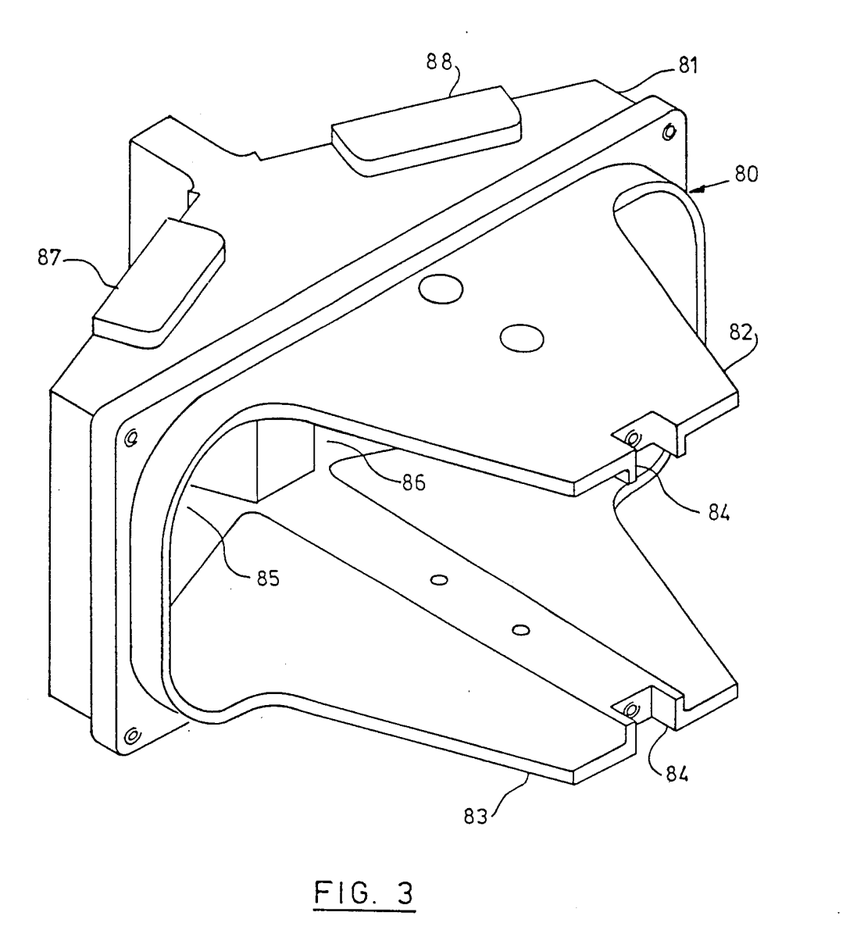
FIG. 3 is an isometric view of a box frame casting employed in the disk file of FIGS. 1 and 2.

As seen in FIG. 3, the box frame consists of a central box portion 81 which provides the main structural strength. Projecting from an open side of the frame facing the disk stack subassembly 10 are two flange portions 82 and 83. These extend in cantilever fashion above and below the disk stack subassembly to support it by means of a fixed non-rotating spindle 11. The flanges 82 and 83 are provided with slots 84 for receiving reduced spindle end portions 12. The spindle ends are formed with two parallel flat surfaces provided with cross bores to permit the disk stack subassembly to be rigidly bolted to the box frame flanges 82 and 83 by bolts 13.

On the opposite side of the box frame 80, the frame is closed except for two large window apertures, 85 and 86, for receiving the linear actuators 50 and 60. These are bolted through mounting flanges 51, 61 against complementary faces, 87, 88, of the box frame from which they are spaced by an O-ring seal 52.

Besides, the disk stack and actuator subassemblies, the frame also supports a filter assembly 91 for removing contamination from the sealed file enclosure formed by cover 90, box frame 80 and actuators 50 and 60 A printed circuit board 92, carrying a Hall effect sensor for detecting the rotational position of the motor is also mounted on the box frame. Finally, the cover 90, which is of thin sheet metal, is mounted in the groove of a rubber sealing strip 94 around the periphery of full box portion 81 of the frame.

The disk stack subassembly 10 comprises a hub 15 mounted for rotation about the spindle 11 by bearings 16 and 17. Axial movement of the hub is opposed by a Belleville washer provided an axial preload. Externally the hub carries a stack of seven magnetic disks 18, separated by spacer rings. The disk stack is clamped to the hub by means of a sprung clamp ring 19. The lower surface of the hub carries a ring magnet 20 for activating the Hall sensor on circuit board 92.

Internally, the hub carries a cylindrical multipole permanent bar magnet 31 which form the rotor of the brushless DC motor 30. The stator 32 of the motor 30, consisting of windings on a laminated core, is fixed to the central non-rotating spindle.

In operation, the motor is driven by a motor drive circuit to rotate the disks 18 past air bearing transducer heads 40. The heads are mounted by means of leaf spring flexures 41 on head support arm portions 53 (FIG. 2) of the actuator carriage 54. The flexures bias the heads into air bearing contact with the rotating disks. In the arrangement of FIG. 2, the heads 40 carried by flexures 41 serve only the lower surfaces of disks 18. A similar set of heads (not shown) is mounted in inverted fashion on the carriage of actuator 70 to serve the upper surfaces of disks 18.

Figure 4:
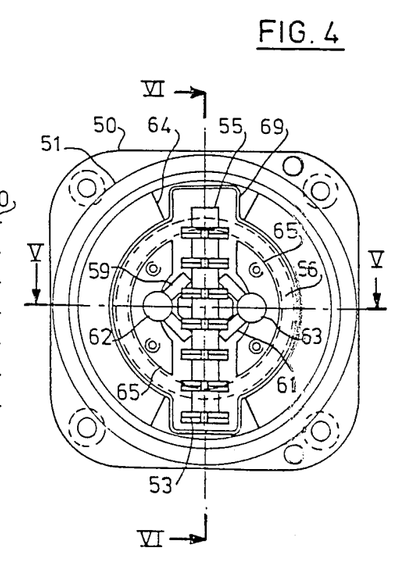
FIG. 4 is a front elevation of one of the voice coils actuators employed in the disk file of FIGS. 1 and 2 with a front flux return plate removed.
Figure 5:
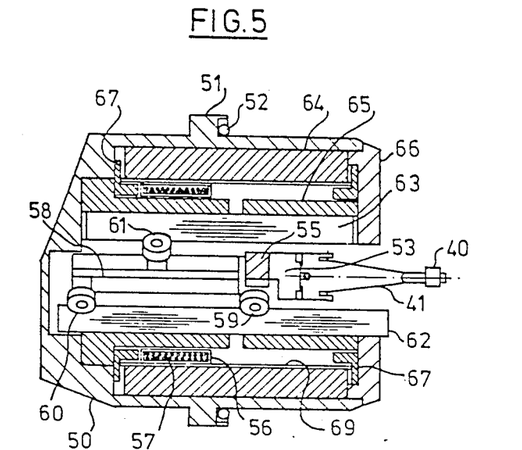
FIG. 5 is a section through the actuator of FIG. 4 taken on the line V—V.
Figure 6:
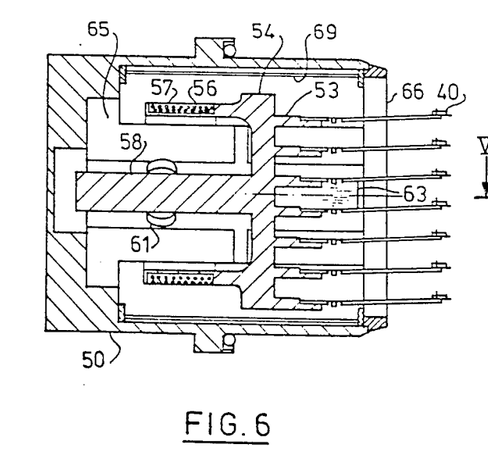
FIG. 6 is a section through the actuator of FIG. 4 taken on the line VI—VI.

Turning now to FIGS. 4, 5 and 6, the actuator 50 is illustrated in more detail. The carriage 54 includes, as has been stated, a number of head support arm portions 53. These project from a vertical bar 55 which spans a cylindrical coil former 56 carrying a voice coil 57. A central beam 58 of cruciform section (shown unsectioned in FIG. 5) projects rearwardly from the center of bar 55 and is provided with sets of wheels 59, 60 and 61 mounted on stub shafts set into the beam. The sets of wheels 59 and 60 run on a fixed cylindrical guide rod 52 while the wheels 61 run on a second parallel guide rod 63 to permit the carriage to move radially towards and away from the axis of rotation of the disk stack subassembly 10.

The voice coil 57 and former 56 are located in a gap of substantially annular cross section between radially magnetized permanent magnet sections 64 and circumferentially divided inner pole pieces 65. The magnetic circuit between magnets 64 and pole pieces 65 is completed by the actuator housing and by a flux return plate 66 (removed in FIG. 4).

The flux return plate also serves to shield the disks from stray magnetic fields emanating from the permanent magnets but is, of course, slotted to enable passage of the heads 40 and their support arm structure. To prevent overtravel of the carriage two rubber rings 67 formed with protuberances to act as end stops are provided at the ends of the flux gap.

A final component of the actuator is a copper sleeve 69 lining the permanent magnetic flux gap and completely surrounding the moving carriage. The sleeve 69 forms a shorted turn around the voice coil to reduce the current rise time of the coil.

In operation, current is supplied to the voice coil 57 of actuator 50 via a flexible cable (omitted for clarity) causing radial movement of the carriage radial movement of the carriage to position heads 40 over selected tracks of disks 18. Positioning may be controlled by a conventional dedicated servo system making use of position reference information on a dedicated surface of one of the disks 18. This aspect of the operation of the file forms no part of the present invention and is thus not described further.

The behavior of the file of FIGS. 1-6 in response to distortions caused by heat and vibration will now be considered. It can be seen from FIGS. 1 and 2 that the file has two planes of substantial symmetry, namely X—X (FIG. 1) and Y—Y (FIG. 2).

The heat generated in the drive motor 30 and in actuators 50 and 70 establishes temperature gradients which can cause distortion or bending of the structure due to differential thermal expansion. However, in the case of the described file, the flow of heat is symmetrical so that the temperature pattern existing at the top of the file will be the same as that at the bottom. Secondly, the structure is symmetrical so that, providing the temperature distribution is also symmetrical, then no distortion will be induced. Thirdly, the structure, as has been described, is much more rigid so that any residual thermal stresses will produce a smaller movement than in the conventional structure.

When the temperature of the file changes due to a change in ambient conditions, the symmetry of the design ensures that any distortion will not produce interhead misregistration but rather other forms of bending, since any distortion of the top half of the structure will compensate for the equal but opposite distortion of the bottom half. The design symmetry and structural rigidity also helps to resist transient misregistration caused by vibrations emanating from the actuators or drive motor. Again, the effects on the spindle ends will tend to minimize out-of-plane modes of vibration.

In addition to the advantages related to minimizing misregistration, the modularity of the design allows separate assembly and testing of the disk stack and actuator subassemblies. Because the disk stack subassembly includes motor and bearings and can be easily supported by means of the fixed spindle ends 12, it is possible to perform such operations as surface analysis testing and servowriting prior to final assembly. This permits faulty subassemblies to be identified and reworked without the need to disassemble or reject the whole file.

Another aspect of the design of the file of FIGS. 1 to 6 is the use of dual actuators 50 and 70 whose associated heads 40 serve the lower and upper surfaces of the disks 18 respectively. By limiting the heads on each arm to face in one direction only, less space is needed between disks 18. This allows either the overall height of the disk file to be lower, with a consequent increase in rigidity, or more disks to be fitted into a given height.

The file shown in FIG. 2 has seven disks. In contrast, in FIG. 7 there is shown a single actuator version of a disk file according to the invention which has only five disks 118 in the same height. This is because additional space must be allowed between disks 118 for both heads on flexures 141 serving the lower surface of the disks 118 and additional heads 142 on flexures 143 serving the upper surfaces of the disks.

Figure 7:
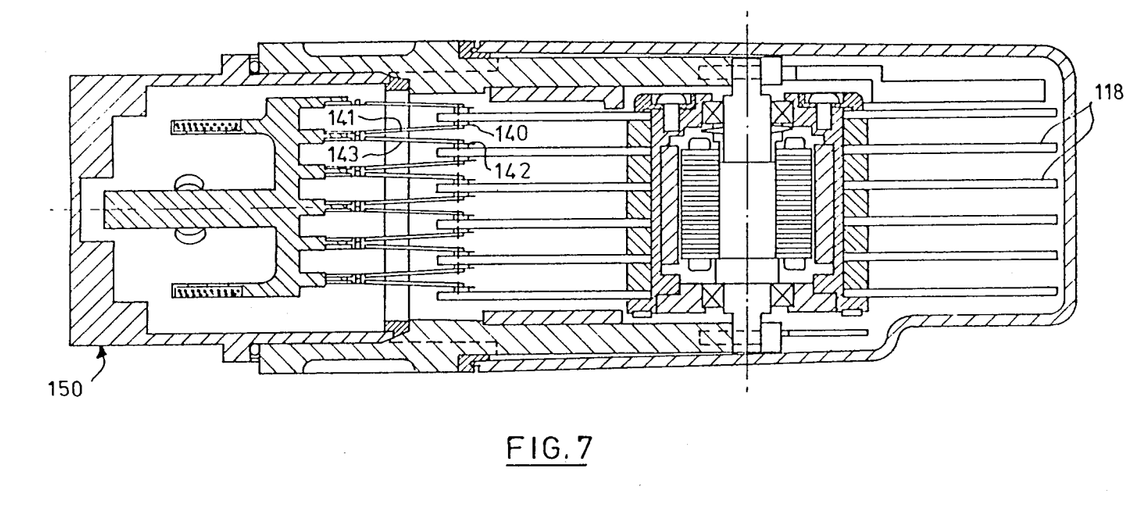
FIG. 7 is a cross-section similar to that of FIG. 2 of a single actuator version of a disk file according to the present invention.

Apart from the difference in numbers of disks and the replacement of the dual actuator by a single actuator 150 having two heads per arm, the construction of the disk file of FIG. 7 is substantially identical to that of the file of FIGS. 1 to 6 and, thus, will not be described. The actuator 150 is mounted on the X—X plane of symmetry (compare FIG. 2) and the file of FIG. 7 thus has all the advantages of symmetry and ruggedness of the file of FIGS. 1 to 6.

What is claimed is:

1. A disk file comprising:
    a disk stack subassembly, the subassembly further comprising
        a non-rotatable central spindle,
        a hub supported for rotation about said spindle by two bearings at or near the opposite ends thereof, the hub being spaced from the spindle to define a cavity,
        an internal electric motor within said cavity for rotating said hub, the motor having stator means mounted on the spindle and rotor means mounted within and on the hub, and
        a plurality of disks mounted externally on the hub;
    a rigid box frame having upper and lower spaced-apart walls and open to at least one side;
    means for rigidly securing opposite ends of the non-rotatable spindle to respective upper and lower walls of the box frame proximate the open side thereof, whereby structural rigidity of the box frame is improved by the secured spindle and the disk stack subassembly is partially enclosed by the box frame;
    at least one actuator for positioning read/write heads radially of the disks;
    means for mounting the actuator on the box frame opposite to said open side supporting the spindle; and
    a cover mating with the box frame on its open side so as to completely enclose the disk stack subassembly.

2. A disk file as claimed in claim 1 further comprising a pair of open slots in the edges of the upper and lower box frame walls for receiving respective ends of the spindle, the slots being complementary in shape to their respective spindle ends.

3. A disk file as claimed in claim 1 in which each end of the spindle is flattened and in which the means for rigidly securing the spindle includes a cross bore across each flattened end of the spindle and bolts for bolting the flattened ends of the spindle to the edges of the upper and lower box frame walls.

4. A disk file as claimed in claim 1 in which the box frame comprises a central box portion located at the periphery of the disk stack subassembly and in which the upper and lower walls comprise upper and lower flange portions, respectively, on said open side extending respectively above and below the disk stack subassembly, the spindle being rigidly secured to the flange portions of the box frame.

5. A disk file as claimed in claim 4 in which the box frame is formed as a single casting.

6. A disk file as claimed in claim 1 in which the disk stack subassembly and the box frame are substantially symmetrical about a first plane (Y—Y) through the center of the disk stack subassembly parallel to the disks.

7. A disk file as claimed in claim 6 in which the disk stack subassembly and the box frame are substantially symmetrical about a second plane (X—X) through the axis of the disk stack subassembly.

8. A disk file as claimed in claim 1 in which the actuator is a linear voice coil motor including an external housing and an internal movable carriage supporting the read/write heads, the linear motor housing being mounted externally on the box frame, and the frame being provided with an opening through which the carriage and read/write heads can access the disks.

9. A disk file as claimed in claim 8 wherein the disk stack subassembly and the box frame are substantially symmetrical about a first plane (Y—Y) through the center of the disk track subassembly parallel to the disks, wherein the disk stack subassembly and the box frame are substantially symmetrical about a second plane (X—X) through the axis of the disk stack subassembly, and in which the center of force of the linear actuator lies in said first plane of symmetry (Y—Y).

10. A disk file as claimed in claim 1 which has two such actuators, mounted on the box frame, which actuators are circumferentially disposed about the disk stack subassembly so that the head movements produced by the two actuators are not in line.

11. A disk file as claimed in claim 10 in which the two actuators span the entire disk stack and each has a plurality of head arms, one head arm from each actuator extending into each inter disk space, the head or heads on each arm serving a single disk surface only.

12. A disk file as claimed in claim 10 in which the two actuators are offset by equal distances above and below said first plane of symmetry, so that each serves a respective upper or lower half of the disk stack.

* * * * *

UNITED STATES PATENT AND TRADEMARK OFFICE
CERTIFICATE OF CORRECTION

PATENT NO. : 4,743,995

DATED : May 10, 1988

INVENTOR(S) : F. E. Castle, C. P. Hatchett, M. R. Hatchett and J. S. Heath

It is certified that error appears in the above-identified patent and that said Letters Patent is hereby corrected as shown below:

IN THE SPECIFICATION:

Column 3, line 58, delete "track" and insert --stack--.

Column 5, line 7, after the word "60", insert a --.--.

IN THE CLAIMS:

Column 8, line 32, delete "track" and insert --stack--.

Signed and Sealed this

First Day of November, 1988

Attest:

DONALD J. QUIGG

Attesting Officer

Commissioner of Patents and Trademarks